(12) United States Patent
Farrag (10) Patent No.: US 11,638,625 B2
(45) Date of Patent: May 2, 2023

(54) ENDODONTIC INSTRUMENT

(71) Applicant: Ola Adel Saied Farrag, Bryn Mawr, PA (US)

(72) Inventor: Ola Adel Saied Farrag, Bryn Mawr, PA (US)

( * ) Notice: Subject to any disclaimer, the term of this patent is extended or adjusted under 35 U.S.C. 154(b) by 160 days.

(21) Appl. No.: 17/314,744

(22) Filed: May 7, 2021

(65) Prior Publication Data

US 2021/0259805 A1 Aug. 26, 2021

Related U.S. Application Data

(62) Division of application No. 16/775,720, filed on Jan. 29, 2020, now Pat. No. 11,083,539.

(30) Foreign Application Priority Data

Oct. 23, 2019 (EG) ................................ 2019101678
Sep. 6, 2020 (WO) ................ PCT/EG2020/000025

(51) Int. Cl.
  *A61C 5/42* (2017.01)
(52) U.S. Cl.
  CPC ..................................... *A61C 5/42* (2017.02)
(58) Field of Classification Search
  CPC ..................................................... A61C 5/42
  See application file for complete search history.

(56) References Cited

U.S. PATENT DOCUMENTS

| | | | | |
|---|---|---|---|---|
| 251,598 A | * | 12/1881 | Johanson | A61C 5/42 433/102 |
| 2002/0037492 A1 | * | 3/2002 | Fischer | A61K 6/56 433/102 |
| 2003/0124485 A1 | * | 7/2003 | Teraushi | A61C 5/46 433/119 |
| 2004/0126735 A1 | * | 7/2004 | Hickok | A61C 1/07 433/119 |
| 2004/0142302 A1 | * | 7/2004 | Aeby | A61C 5/46 433/141 |

* cited by examiner

*Primary Examiner* — Nicholas D Lucchesi
*Assistant Examiner* — Hao D Mai
(74) *Attorney, Agent, or Firm* — Alfred M. Walker (57) ABSTRACT

An endodontic file, for manual or motor driven use by an endodontist, includes a color-coded handle, a shank, and a serrated cutting edge. The cutting edge of the endodontic file is side-cutting with pyramidal teeth and ends in a pointed tip. The endodontic file is used manually inside the root canal in an "up and down" axially aligned motion and these pyramidal teeth will provide a ripping action. A second type of endodontic file has a curved cross section and a sharpened tip. with pyramidal teeth lining the edges of curved blade section. A third type of endodontic file has a flat debriding side which tapers to a point; with a series of adjacent 3-D pyramids emerging from this surface for removing loose material or in urging already loosened material from a root canal.

20 Claims, 7 Drawing Sheets

ENDODONTIC INSTRUMENT

RELATED APPLICATIONS

This application is a divisional of application Ser. No. 16/775,720, filed on Jan. 29, 2020, which '720 application is incorporated by reference herein. Applicant claims priority pursuant to 35 U.S.C. § 120 therefrom. The '720 application claims benefit of Egyptian provisional patent application 2019101678, filed Oct. 23, 2019, under 35 U.S.C. § 119 (b) and 37 C.F.R. § 1.55 therefrom. The Egyptian '678 provisional application is incorporated by reference herein.

FIELD OF THE INVENTION

The present invention relates to hand-held and mechanized endodontic retreatment files which can be used in endodontic re-treatments, as well as in original root canal treatments.

BACKGROUND OF THE INVENTION

Successful root canal treatment depends on adequate debridement and filling of the entire root canal system. Failure to recognize the presence of an additional root canal, adequately remove the pulp tissue, and disinfect and obturate the root canals properly, may cause the failure of the entire treatment. Therefore, it is important to be familiar with the variations in the root canal morphology because such knowledge can help in the location and negotiation of the canals as well as proper subsequent intervention of using the right root canal instrumentation to create a tapered shape with adequate volume to allow effective irrigation and filling.

Many instruments, devices and instrumentation techniques have been recommended but only few seem to be capable of consistently achieving these primary objectives of root canal preparation. Methods of mechanical preparation include manual preparation using K and H hand files, ultrasonic instrumentation, and automated rotary systems (e.g. Protaper, D-race, MTwo-R):

Proper biomechanical cleaning and shaping of root canals requires the use of stainless-steel hand files with the increase of stiffness in larger instrument sizes that may cause several mishaps, such as ledges, zips, perforation and root canal transportation. This was replaced by rotary instruments which possess advantageous bending and torsional properties attributed to their low modulus of elasticity but are prone to fracture and provide less than optimum cleaning efficiency of the root canal.

Neither of the hand or rotary endodontic instruments currently on the market can provide complete debridement or removal of existing obturating material.

Another problem associated with using spiral fluted shaped endodontic files is that they tend to have a diameter that is larger than the thickness of the gutta percha material surrounding a plastic "carrier" core that replaces the removed human tissue pulp and nerves of the original root canal treatment. The carrier core can place increased torsional fatigue on the spiral endodontic file instrument, requiring longer time to remove the coagulated gutta percha material surrounding the plastic carrier core, or can damage the spiral endodontic file instrument itself.

The torsional fatigue problem is an industry wide problem in endodontic re-treatments. Scholarly literature documents attest to these problems.

For example, Nevares, et al, in Gutta PerchaCore More Easily Removed from the Root Canal Than Thermafil? An ex-vivo study, J Can Dent Assoc 2015; 8:f22 notes that the use of ProTaper retreatment files is an efficient method for removing filling material, but this technique alone may not suffice. As noted in Neveras, et al, "In the present study, retreatment time for the samples filled with Thermafil was significantly longer than for those filled with GuttaCore or continuous wave of condensation (control group). In 2013, Beasley et al and others also observed longer retreatment time with Thermafil compared with GuttaCore. However, despite the significant difference, this may not be relevant clinically. The increased time required was attributed to greater difficulty in removing the plastic carrier. According to Wilcox, 30 "Adequacy of Thermafil retreatment may be related more to the ability to easily remove the carrier than to the technique of gutta-percha removal."

Beasley, et al, in Time Required to Remove GuttaCore, Thermafil Plus, and Thermoplasticized Gutta-percha from Moderately Curved Root Canals with ProTaper Files, Journal of Endodontics, Volume 39, Number 1, January 2013, notes that Themiafil carriers may increase the ease and efficiency of obturation, but in the event of failure, their retreatment adds a layer of complexity to treatment decisions. The tendency of ProTaper Retreatment files to unwind and separate that was found in this study may be related to the taper of the ProTaper Retreatment files (15, 35) or the speed at which they rotate in curved canals (13). These events occurred more frequently in the Thermafil group, which may be attributed to the increased torsional fatigue placed on the instruments by the plastic carrier.

Besides the use of rotary instruments to grind away gutta percha surrounding dense, hard plastic centrally located carrier cores in a root canal re-treatment procedure, practitioners normally tend to combine multiple means together, i.e, initiate re-treatment with rotary files, irrigate with solvents, use rotary and hand file alternately and apply some heat as well.

As of now, all these techniques have shown some success in re-treating regular root canal treatments filled only with gutta percha, but not the more recent carrier-based re-treatments, which is the targeted subject matter of this present application.

For example, the use of heat as in "System B Heat Source" in trying to remove gutta percha in a previously treated root canal can cause injury to the periodontal ligaments. For example, Lipski, et al., in In Vitro Infrared Thermographic Assessment of Root Surface Temperature Rises During Thermafil Retreatment Using System B, Journal of Endodontics, Vol. 29, No. 6, June 2003, notes that Thermafil retreatment using System B Heatsource plugger inserted for 5 seconds generated temperature rises three times higher than permissible. As expected, the temperature rise was higher when the plugger placement time was increased to 8 seconds.

Because the possibility exists that periodontal structures including the periodontal ligament, alveolar bone, and vasculature could insulate and protect the periodontal unit from damaging temperature rises, this study should be performed in an in vivo model. Meanwhile, endodontic practitioners should exercise caution when using the System B technique to retreat Thermafil obdurate teeth. More importantly, Lipski, et al., noted the inherent problems for the patient if elevated heat were used. Lipski, et al., stated: "It is generally accepted that a 10° C. elevation in temperature on the root surface, to approximately 47° C. is potentially damaging to the cementum, periodontal ligament, and alveolar bone"

citing Eriksson A R, Albrektsson T. Temperature threshold levels for heat-induced bone tissue injury: a vital microscopic study in the rabbit, J Prosth Dent 1983:50; 101-7, Saunders E M. In vivo findings associated with heat generation during thermomechanical compaction of gutta-percha. Part II. Histological response to temperature elevation on the external surface of the root. J Endodon 1990:23:268-74, Lipski M. The temperature rise on the outer root surface during root canal filling by Thermafil obturators. Magazyn Stomat 1999; 9:28-31.

Both solvents and heat are regularly used in endodontics but owing to their side effects, their usage should be limited to the minimum and in special situations only. For example, in Duncan et al, Removal of root filling materials, Endodontic Topics 2011, 19, 33-57, an article that explains different methods of removing gutta percha, solvents are described as being useful for dissolving gutta percha, but that most solvents are questioned for being cytotoxic and studies are looking for more safer ones. With respect to chloroform as a solvent for dissolving gutta percha, Duncan et al states at page 39 "However, concerns have been raised regarding its cytotoxicity if it comes into contact with periapical tissues; it has been classed as a carcinogen and a potential risk to the dental team."

Alhashimi, et al, An In Vitro Assessment of Gutta Percha Coating of New Carrier-Based Root Canal Fillings, Scientific World Journal, Vol. 2014, article ID 239754, 6 pages, notes that root canal treatments include insertion of approximately 25 mm length carrier cores, each having thicknesses of about 0.60 mm+/−0.02 mm to about 0.66 mm+/−0.04 mm at predetermined cross sectional areas. It is also noted that these carrier cores are surrounded by gutta percha material Alhashimi et al measured the thickness of gutta percha surrounding the carrier at four points, representing 12 o'clock, 3 o'clock, 6 o'clock and 9 o'clock along the circumference of the gutta percha at designated portions of the carrier core. In one example, the thickness of the gutta percha material surrounding the carriers having respective thicknesses of 0.60 and 0.66 mm, where the gutta percha at the four designated clock locations had thicknesses 0f 0.376 mm+/−0.027 mm at the top, 0.164+/−0.023 at the 3 o'clock location, 0.357 mm+/−0.033 mm at the six o'clock designation and 0.591 mm+/−0.034 mm at the 9 o'clock peripheral location.

Therefore, according to Alhashimi, et al, the thickness of gutta percha varied from about 0.164 to about 0.591 mm in thickness between the dentin and the outer surface of the carrier core.

Consequently, in re-treatment procedures, it is necessary to cut into the gutta percha surrounding the carrier core. The problem with typical spiral rotary endodontic files with spiraling fluted surfaces is that at their respective distal ends, the initial outer diameter at the distal end may be 0.19 mm/mm, but it increases in outer diameter to about 1.2 mm/mm at the top proximal end, as in the endodontic files of ProTaper Shaping file X. It would be difficult to use the tapered endodontic file that widens to 1.2 mm/mm for trying to dig into and remove gutta percha having diameters of about 0.376 mm, 0.357 mm or 0.591 mm, as discussed in Alhashimi, et al, since much of the spiral endodontic file could be significantly in excess in diameter of the gutta percha material sought to be removed. Therefore, it would be a tight squeeze to insert a typical spiral rotary endodontic file into the thin gutta percha material surrounding the resistant plastic carrier core.

Brown, in Retreatment of Thermafill Carriers, Tri City/Fallbrook Microendodontics, 2018, discloses that retreatment of Thermafil Carriers is difficult because the metal or plastic carriers are dense, so that penetrating them is "tough and/or impossible." Brown also discloses the "Braiding Technique" by inserting a plurality of H-Files into the canal adjacent to the carrier to bind it to the H-Files and remove it. But first the adjacent gutta percha material must be removed by solvents or grinding down into removable pieces.

Prior art also reveals several options for implementing a powered endodontic spiraled fluted handpiece. W & H DentalWerks of Germany describes a motor driven handpiece for cutting jaw bones, which may be adapted for orthodontic rework. Their S-8 series supports sagittal, oscillating, or reciprocating movement. U.S. Pat. No. 8,910,727 of Bar-Cohen, et al. for an ultrasonic/sonic jackhammer is one approach that would involve miniaturization of the construction tool described; rotation would have to be added. U.S. Pat. No. 4,353,698 of McSpadden has an electric motor driven power head for a rotary drive to compact GP in initial root canal procedures. U.S. Pat. No. 10,383,702 of Levy describes an angle piece head that actually imparts both rotary as well as angled mechanical impulses. U.S. Pat. No. 5,770,913 of Mizzi and U.S. Pat. No. 6,069,420 of Mizzi, et al., for specialized actuators driven by oscillatory transducers are involved with linear as well as rotary motors that can use a wide variety of prime movers including electric as well as pneumatic elements.

OBJECTS OF THE INVENTION

A new endodontic file with side cutting-edge and a flat cross section is described. The cutting edge has pyramidal teeth (hence the tradename P-file) which are shaped in a preferred embodiment as an isosceles triangle.

The P-file aims to provide a cutting alternative for cleaning and shaping as well as retreatment of the root canal.

It is therefore an object of the present invention to re-treat a previous but damaged root canal treatment by removing a centrally located carrier, (i.e. "core"), surrounded by a sleeve of gutta percha, which is done in an indirect way by removing the gutta percha, without damaging the carrier, then the carrier can be easily removed without damage to the carrier or to the surrounding dentin of the patient's root canal needing re-treatment, due to new infections or trauma, resulting in structural damage to the original tooth and/or post, core or crown of the patient's tooth.

The new endodontic "P-file" aims to provide a new cutting alternative to current protocols of cleaning and shaping as well as re-treatment of root canal system. The file is more efficient, saving time and poses fewer side effects on the tooth structure.

It is also an object of the present invention to be able to provide a thin saw teeth endodontic file, which is sharp enough and thin enough to dig into and remove gutta percha material separating the centrally located, hard plastic carrier core in an endodontically treated root canal from the patient's teeth. This emphasizes the fact that the narrow cross-section of the cutting teeth of the endodontic file of the present invention is critical to the main concept of the endodontic file and the fact that this is a unique design not manufactured before.

Other objects will become apparent from the following description of the present invention.

Retreatment of prior root canal treatment is important in endodontics. In the event the re-treatment is not done properly, the only options the patient will have are surgical re-treatment or extraction. Medical conditions and cost can prohibit patients from doing surgical re-treatment and they opt for extraction of the tooth. Hence, the ultimate goal of this new file design is to save teeth from extraction.

According to the American Association of Endodontics, in its website information about endodontic re-treatment, it is noted that "with proper care, even teeth that have had root canal treatment can last a lifetime. But sometimes, a tooth that has been treated doesn't heal properly and can become painful or diseased months or even years after treatment. If your tooth failed to heal or develops new problems, you have a second chance. An additional procedure may be able to support healing and save your tooth. If you have pain or discomfort in a previously treated tooth, talk to an endodontist about retreatment."

SUMMARY OF THE INVENTION

In keeping with these objects and others which may become apparent, the present invention is a new endodontic file, the P-file, which, for manual use by an endodontist, includes a color-coded handle, a cylindrical or preferably cuboid shaped shank, and a cutting edge blade with a linear array of adjacent saw teeth. The endodontic file is designed to follow the ISO standardization with a size of 15-45 mm. The P-file is made of stainless steel or Ni—Ti (nickel titanium) using a 3D laser cutting machine, wire machining or CAD/CAM milling. The cutting edge of the endodontic file is side-cutting with pyramidal teeth and ends in a pointed tip. The P-file is to be used manually inside the root canal in an "up and down" axially aligned motion and these pyramidal teeth will provide a ripping action.

A second type of endodontic file has a curved cross section and a sharpened tip. It is shaped roughly as a "vegetable corer" with pyramidal teeth lining the edges of blade section. It is designed to be used manually with a handle in an up & down motion while cutting in either side that is forced against the material to be removed during debridement of either initial or retreatment procedures. Preferably the corer's C-shaped cross section has an inner radius of curvature slightly larger than the outside diameter of the carrier core in the tooth canal being retreated, so it fits easily in the annular gutta percha space between the carrier core and tooth dentin. In an optional embodiment the saw teeth denticular projections can also be on the sharp distal end, instead of being a continuous curved sharp blade. Alternately, the location of the saw tooth denticular projections can be on any portion of the portion. With teeth on the bottom distal edge, the corer can be a "starter tool" for retreatment in the top (proximal region) of a tooth canal. The endodontist would set it around the core and rotate it by hand to cut through the top portion of the gutta percha annular ring near the top of the tooth canal being re-treated.

A third type of endodontic file has a flat debriding side which tapers to a point; a series of adjacent 3-D pyramids emerge from this surface. This is used as aid in removing loose material or in urging already loosened material from a root canal.

Other embodiments involve the use of file teeth with different profiles as well as files with teeth on both edges.

In an alternate embodiment, the teeth may be other than isosceles equal sided triangles. For example, they could have a side cutting surface at any amount and then a vertical surface adjacent to and extending down from the apex of the angled surface.

They can also be an alternate embodiment, have equal sided triangles, but not isosceles, so that they would have less of an angle, but be equal.

Another embodiment would be where one of the sides of the triangle would be longer than the other, so that it would have less of an angle than the adjacent side.

In addition, in certain embodiments, the triangles of the saw teeth at the valleys, between adjacent saw teeth triangles, will be rounded off so that it is easier to make than to just have them both converge to points in the valleys between the adjacent saw teeth triangles, so that there will be a concave cavity at the bottom.

In another embodiment, instead of having a cylindrical shank holding portion for the cutting blade of the endodontic file for treatment in the root canal, the shank can have a cuboid or boxlike shape, with perpendicular sides and top and bottom, which is stronger to support the saw teeth blade. Cuboids are convex polyhedrons which have six faces with edges, where adjacent faces are perpendicular to other adjacent faces of the polyhedron.

In another embodiment, the endodontic file can optionally have parabolic-shaped saw teeth adjacent to one another, where instead of linear sides extending upward towards an apex point, the sides would be extending upward and converging towards a tangent to a curve, as in a parabola.

Therefore, in general, the saw teeth comprise two or more linear sides converging to a top apex point or region. When the converging sides are linear converging to an apex, the shape of each saw tooth is that of a triangle, either equilateral or non-equilateral. If the converging sides are curved and arcuate, converging to a curved apex, then the shape of each saw tooth of the blade is that of a parabola, or one half of an inverse parabola.

In some cases, when viewed from the top, there will be the linear portions of the cutting edges, will extend side to side, but less of a width than the blade supporting portion, which extends from the shank, so that when viewed from an end view, it would be a trapezoid, where the smaller portion on top would be the cutting surface and the wider bottom portion would be the bottom of the blade support portion In that version, both the teeth and the blade support portion would be coterminous with each other, with no joints, although extending slanting upward as in the sides of a trapezoid.

Another situation would be when the gutta percha is in the root canal and it is failing and must be removed, The gutta percha is normally a seal around a hardened, plastic carrier core, so that if one uses sole spiraling endodontic files, they will not work, because they will get resistance when contacting the essential core carrier, which is surrounded by the gutta percha material, which can be removed with the saw teeth. Therefore, in the present invention, the saw teeth are cutting on a surface and they can easily be manually or motor driven through the surrounding circumferential gutta percha, which surrounds the exterior surface of the core carrier, which cannot be done with a spinning, fluted, spiraling endodontic file.

Therefore the main goal of the endodontist in re-treating this kind of obturation material (carrier-based obturation materials) is to maintain the carrier as intact as possible for easy retrieval and by using the thin saw-blade teeth and thin cross-section of the cutting part, the file can fit between the carrier and the dentin wall ripping through the gutta-percha without potentially damaging the carrier core which is something the rotary files can't do owing to their rounded cross-section.

This emphasizes the fact that claiming the cross-section of the cutting teeth is critical to the main concept of the file and the fact that this is a unique design not manufactured before.

In general, the sizes of the files are standard endodontics of 15-45, which is classified where the tip is at 0.15 mm, up to 0.45 mm at the tip.

In a preferred embodiment, the side facets of the saw teeth will converge to an apex point, as opposed to converging to a linear extending cutting edge, extending between opposite upwardly extending sides of the debriding cutting blade.

When used with motor drive, there will be a chuck for attaching it to a motor driven device, such as the W and H "Dental Werk" motor-driven bone cutting blade of Germany.

When in a motor driven embodiment, these new endodontic files may be powered in an "up and down" jackhammer-type axial movement, alternately in a rotary movement, or in combinations thereof, by a motor driven handpiece. For example, these new manually operable endodontic files may alternatively be powered in a mechanized motor driven embodiments, similar to a miniature jackhammer providing up and down axially aligned movement or in a further motor driven mechanized embodiment, including a rotary movement by a motor driven handpiece, or combinations of both axial up and down and rotary motions.

In summary, the endodontic re-treatment instrument includes a handle; a debriding section; a shank connecting the handle to said debriding section; and the debriding section comprises a member with an upper edge having sharp saw tooth denticulated projections and a lower blade-supporting portion.

The sharp saw tooth denticulated projections comprises two or more sides extending up from the lower blade-supporting portion and converging to a top apex.

In various embodiments, the two or more sides of the sharp saw tooth denticulated projections are linear, converging to said apex, or are arcuate, forming a parabola, or are also arcuate, formed from adjacent inverse parabolas, where the arcuate sides converging to a pointed apex.

In another embodiment, each sharp saw tooth denticulated projection tapers toward a linear extending top sharp cutting edge, and where each sharp saw tooth denticulated projection extends side to side but with less of a width than said lower blade-supporting portion which extends from the shank, so that the debriding section has a trapezoidal cross section, wherein a top cutting edge is narrower than the wider, lower blade-supporting portion, so that respective flat sides of the upper edge and the oblique lower blade-supporting portion are coterminous with each other, extending slanting obliquely upward.

Alternately, in a preferred embodiment the linear converging sides of the sharp saw tooth denticulated projections converge to an apex cutting point.

In a further embodiment, the sharp saw tooth denticulated projections are three-dimensional triangular profile pyramids.

Preferably, the debriding section tapers to a narrowed distal end, and the shank and debriding section are orthogonal to its length. While the shank can be cylindrical, preferably the shank is cuboid in shape.

The distal end of the debriding section is ground to a sharp cutting edge.

In another optional embodiment, the debriding section comprises a flat extended member with upper and lower edges, with the upper edge having the sharp saw tooth denticulated projections and concave curved valleys between respective sharp saw tooth denticulated projections.

The endodontic re-treatment instrument can have evenly high sharp saw tooth denticulated projections, or sharp saw tooth denticulated projections of variable levels, preferably with pointed tops.

While the triangular saw tooth denticulated projections are preferably linear, optionally the projections can have curved sides forming projections which are hyperbolic in shape.

In another embodiment, the debriding section includes a flat extended member with upper and lower edges having respective bi-level sharp saw tooth denticulated projections along both upper and lower edges.

The endodontic re-treatment instrument is preferably made of stainless steel, or nickel titanium, as well as from durable synthetic plastic materials.

The endodontic instrument is configured to be thin enough to cut into the gutta percha material surrounding a carrier core in a treated root canal, as opposed to wider rotary instruments which because of their increased width can inadvertently contact the durable carrier core, and be subject to torsional fatigue and/or breakage of the instrument or of the surrounding dentin.

In its thin configuration, the endodontic re-treatment instrument includes sharp saw tooth denticulated projections which are preferably are triangular, having concave curved valleys therebetween, where the instrument has a width of between 0.10 mm and 0.50 mm, a length of between about 20 mm and 30 mm and a vertical height of between 0.40 mm and 0.75 mm, excluding a handle or motor driven adaptor at a proximal end thereof.

Preferably, the aforementioned endodontic instrument has a thin width of about 0.25 mm, a length of about 25 mm and a vertical height of about 0.57 mm.

In a further alternate embodiment resembling a vegetable corer, the endodontic re-treatment instrument includes the shank and debriding section being a straight, partially tubular member with a C-shaped cross section orthogonal to its length, having spaced and facing parallel edges along a length thereof, and the spaced parallel edges along the debriding section have the sharp saw tooth denticulated projections extending along at least a portion of said parallel edges of said straight partially tubular member with said C-shaped cross section.

Besides being handheld and manually operated, in the alternate motor driven embodiments, the endodontic re-treatment instrument further includes an adaptor connectable to the shank for providing motor driven straight up and down, rotary in either direction, or alternate motions of the debriding section.

The present invention also includes a method of clearing a root canal in preparation for retreatment comprising the steps of:

a) inserting into said root canal an endodontic re-treatment instrument comprising a handle, a debriding section, a shank connecting the handle to the debriding section, where the debriding section comprises a flat side with an upper edge having sharp saw tooth denticulated projections along a side opposite to said flat side, with each sharp saw tooth denticulated projection extending upward; and b) moving the instrument within the root canal for engaging a gutta percha sleeve surrounding a central carrier core therein until the carrier core is released from the root canal, permitting its removal.

The method optionally a power unit mounted between the handle and the shank for providing straight up and down, rotary in either direction, or alternate motions of the debriding section.

Optionally the method includes clearing a root canal in preparation for retreatment where the shank and debriding section comprise a straight, partially tubular member with a C-shaped cross section orthogonal to its length, having spaced and facing parallel edges along a length thereof, and the spaced parallel edges along the debriding section have the sharp saw tooth denticulated projections extending from flat bases along the spaced parallel edges.

This optional step of using a vegetable corer type configuration can also include a power unit mounted for providing straight up and down, rotary in either direction, or alternate motions of the debriding section.

While the endodontic file of the present invention is primarily for endodontic retreatments of root canals, it can also be used for debriding of damaged pulp and nerves in root canals being subject to initial root canal treatments.

Normally the user does not need to use heat with the P-file, and solvents might not be used since the design of the P-file teeth will navigate areas that are unreachable with the rotary files and will provide better cutting efficiency than the regular hand files in the market (namely the K and H).

The endodontic file of the present invention with saw teeth denticulated projections serving as a cutting blade normally doesn't require the application of heat or solvent to breakaway or dissolve gutta percha prior to removal of the central carrier core, but practitioners can elect to use either or both as adjuncts, since rotary instruments generally cannot be used solely for the re-treatment, but care needs to be considered owing to the adverse side effects of heat and solvents discussed above.

Therefore, the cutting design configuration of the P-file of the present invention can help in reducing the need of using heat and/or solvents and thus avoiding their known adverse side effects.

BRIEF DESCRIPTION OF THE DRAWINGS

The present invention can best be understood in connection with the accompanying drawings. It is noted that the invention is not limited to the precise embodiments shown in the following drawings, in which.

DETAILED DESCRIPTION OF THE DRAWINGS

Figure 1:
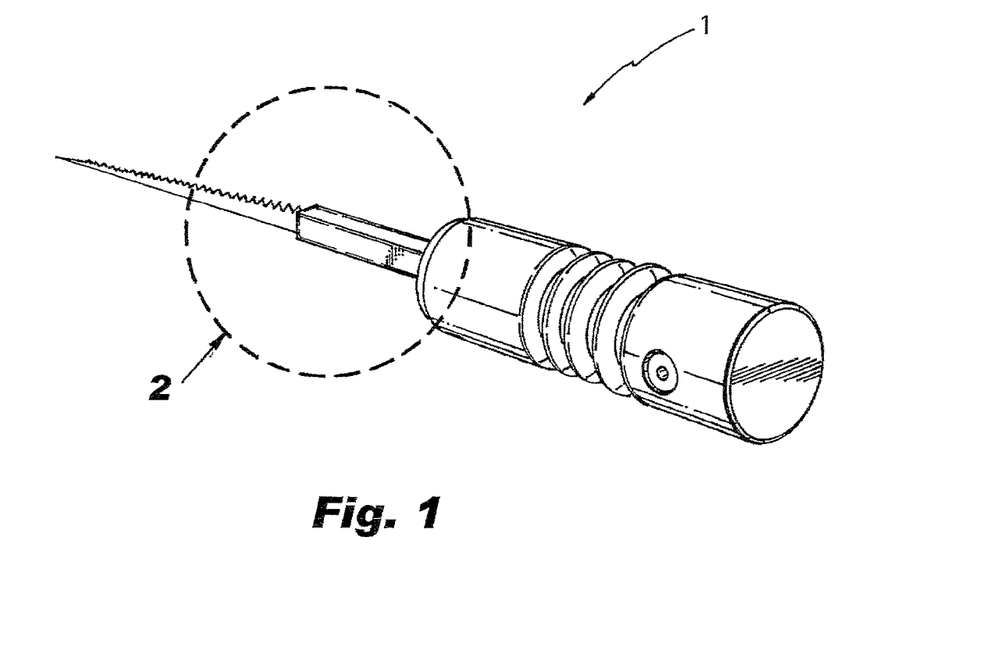
FIG. 1 is a perspective view of a P-file of this invention.
Figure 2:
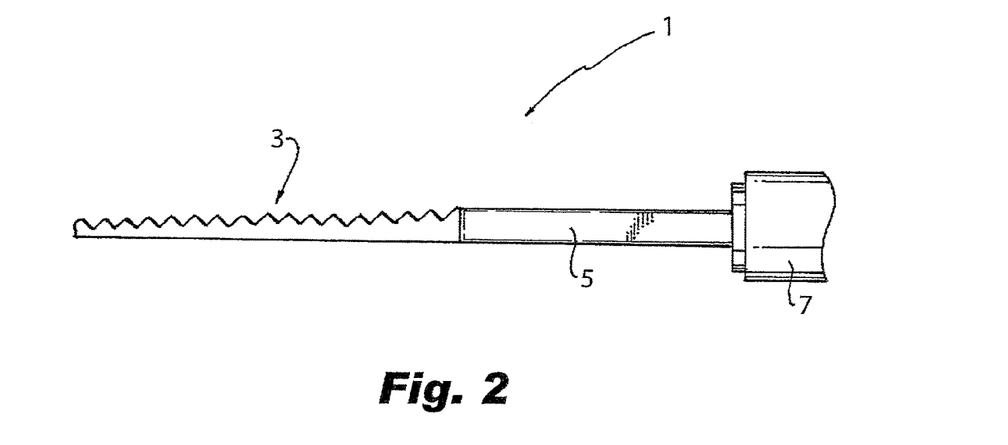
FIG. 2 is a close-up detail perspective view of the P-file of FIG. 1, taken along circular view line "2" of FIG. 1, showing some cutting teeth which each extend to a respective single point cutting pinnacle point, where the cutting blade is supported by and positioned adjacent to a preferably mainly cuboid shank support, which is insertable into a handle.

FIGS. 1 and 2 illustrate two views of P-file 1 with handle 7, shank 5 on metal portion, and a debriding cutting blade 3, with denticulated projections, such as pyramidal cutting teeth, which are preferably flat but with triangular shaped profiles, when viewed in side elevation views. The teeth of debriding cutting blade 3 are used for removing from debris within a tooth, such as pulp and nerve tissues in an original endodontic root canal procedure or to remove gutta percha and debris from a previously treated root canal, so that a centrally located carrier core can be removed, without damage to its integrity, during the re-treatment of the root canal.

FIGS. 1 and 2 show the preferred embodiment where the cutting teeth of debriding cutting blade 3, are shown bearing isosceles triangular shapes in profile, and where the teeth have a forward facing side face that extends vertically, coterminous with the flat, also vertically extending blade support member portion of the blade below the teeth. The pinnacle point of each tooth 3 of the cutting blade of the endodontic file 1 is a single geometric point, as opposed to a linear extending cutting portion of FIGS. 3A and 3B, where in FIG. 2 the respective sides and rear of the saw teeth converge at the pinnacle point. The shank 5, from which the cutting saw blade 3 extends, preferably has a cuboid cross section, with perpendicular sides and top and bottom, which is stronger to support the cutting blade 3 of sharp saw teeth. Cuboids such as shank 5 are convex polyhedrons which have six faces with edges, where adjacent faces are perpendicular to other adjacent faces of the polyhedron.

Figures 3A, 3B, 4A, 4B:
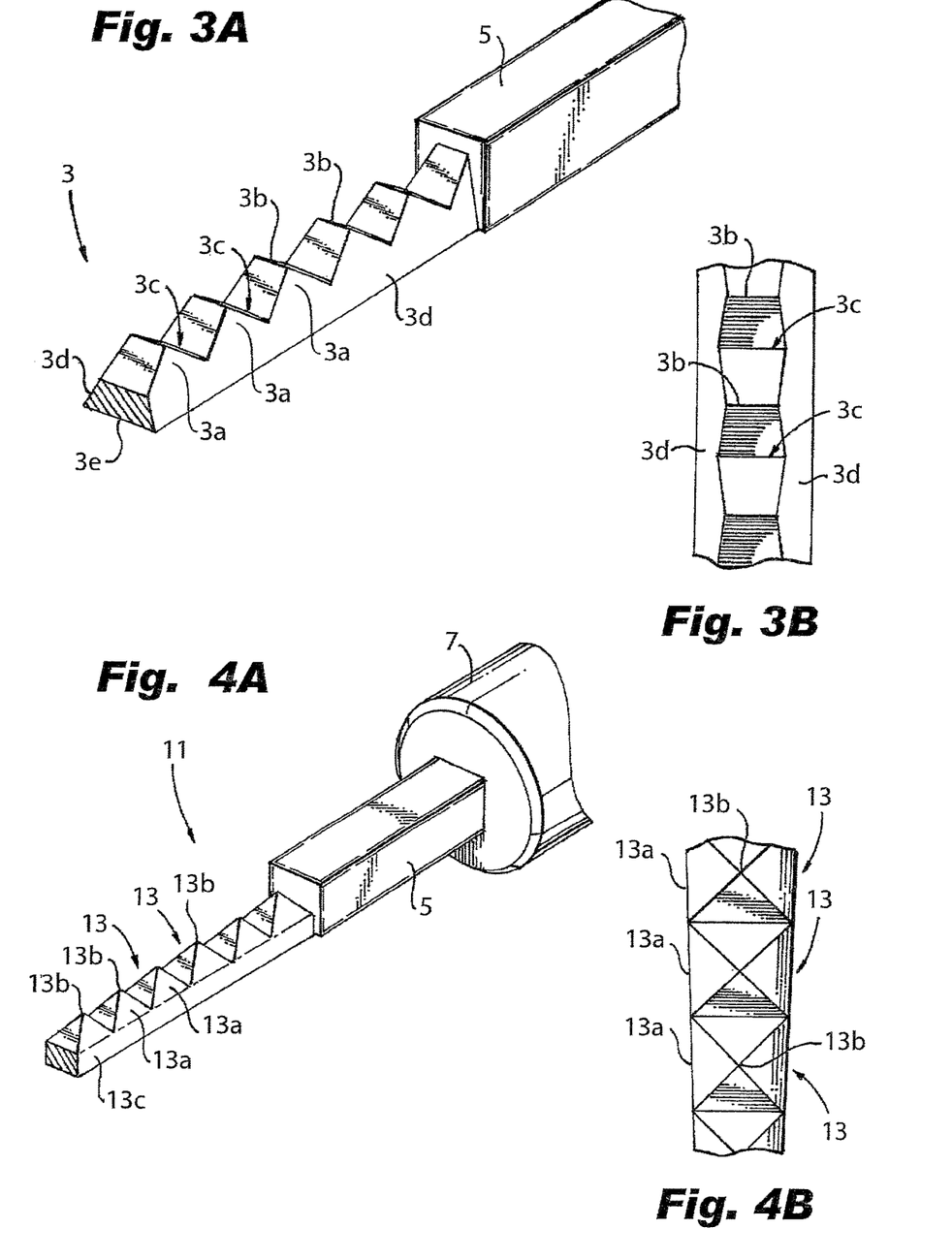
FIG. 3A is a perspective detail view of a cutting blade teeth and support portions of triangular shaped saw teeth, which have planar sides which are co-terminus with the sides of the cutting blade support portions, where the top cutting edges of the saw teeth extend linearly, but not as wide as the base of the support portions, where the saw teeth and support portions are coterminous with each other and slanted upward from a base which is wider than the apex of the saw teeth.
FIG. 3B is a top plan view of the cutting blade and blade support portion of FIG. 3A.
FIG. 4A is a close-up perspective view of an alternate embodiment for an endodontic file with 3-D pyramidal shaped debriding teeth.
FIG. 4B is a top plan view of the endodontic file of FIG. 4A.

In one alternate embodiment, FIGS. 3A and 3B the respective cutting blade portion 3 has triangular-shaped saw teeth 3a having sharp top edges 3b, lower valley depth regions 3c, flat side facets 3d and lower blade support portions 3e. The saw teeth 3a's planar sides are co-terminus with the planar sides of the blade support portions 3d, where the top cutting edges 3b of the saw teeth 3a extend linearly, but not as wide as the base of the blade support portion 3e, where the saw teeth 3a and blade support portion 3e are coterminous with each other and slanted upward from a lower base of blade support portion 3e, which is wider than the apexes 3b of the saw teeth 3a, so that in the view of FIG. 3A, the cross sectional end of the cutting blade portion 3 is trapezoidal in shape. It is further noted that even when the endodontic cutting file of FIGS. 3A and 3B is very thin, the linearly extending cutting edges 3b of the saw teeth 3a can present themselves as almost pointed pinnacles, where each side of the cutting blade portion 3 are separated from the other side by the tiny linearly extending cutting edges 3b of the saw teeth 3a. Furthermore, while the cross sectional ends of the cutting blade portion 3 are shown as trapezoidal, they can also alternatively present themselves as vertically extending side edges of a cutting blade portion with saw teeth 3a and top cutting edges 3b.

The perspective detail view of another alternate embodiment for a three-dimensional endodontic file 11 in FIG. 4A shows an endodontic file with shank 5 and a debriding section member 13 with three dimensional (3-D) pyramidal teeth 13a tapering to a point 13b. The teeth 13a in the form of 3-D pyramids emanate from a flat blade support base 13c in forward debriding section member 13, are shown more clearly from above in FIG. 4B. While FIGS. 4A and 4B show classical four-sided pyramid shapes for the cutting teeth 13a, it is known that other non-traditional pyramid shapes may be presented with three sides, or more than four sides, emanating into a top pinnacle point 13b.

Figure 16:
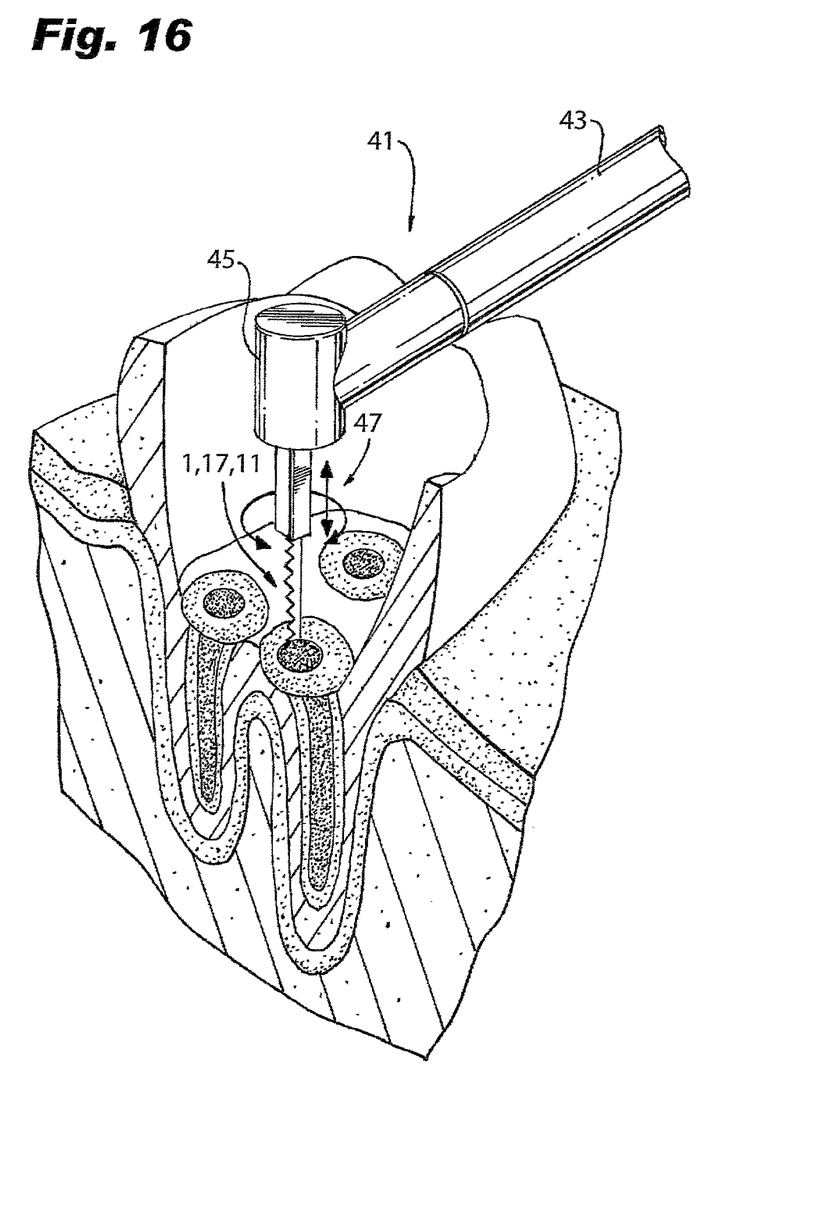
FIG. 16 is a perspective view of a powered handpiece driving an endodontic file.

The endodontic instrument 1 of FIGS. 1, 2, 3A and 3A, and the instrument 11 of FIGS. 4A and 4B, can either have a handle for manual rotation and cutting by the endodontist, or can be attached to a power tool 41 in a motor driven version, such as shown in FIG. 16.

Figures 5A, 5B:
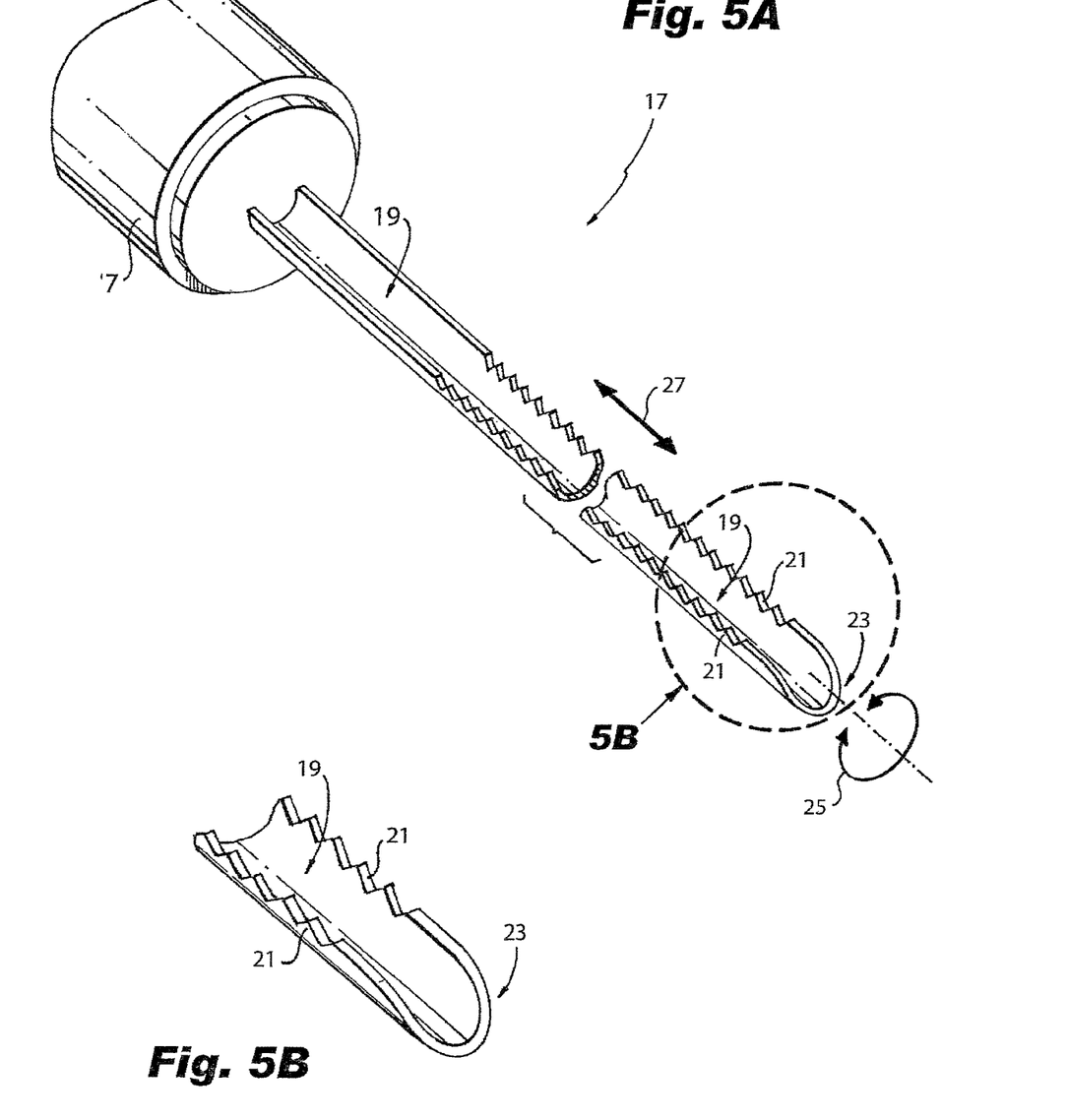
FIG. 5A is a side perspective view of a further alternate embodiment for a "corer" endodontic file with pyramidal teeth on both file edges of a hollow half cylindrical two-sided cutting blade, having a hollow region between the arcuate file cutting saw blade edges, forming a curved "C-shape" cross sectional configuration.
FIG. 5B is a close-up perspective view of the embodiment shown in FIG. 5A, taken along circular view line "5B" of FIG. 5A.

FIGS. 5A and 5B show a perspective view of a further alternate embodiment for a "corer" endodontic file 17 of this invention. The metal cutting section 19 is straight with a curved cross section orthogonal to its length. The top portion that is engaged with handle 7 is the shank which is also curved but has no cutting teeth. Pyramidal cutting teeth 21, similar to teeth of the cutting blade 3 of the embodiment of FIGS. 1-2, or of the teeth 3a of the embodiment in FIGS. 3A and 3B, are formed on the axial edges of the forward section of metal cutting section 19. The distal end 23 of the cutting section 19 is ground to a sharp cutting distal end. In use, file 17 is moved up and down and rotated in clockwise or counterclockwise directions 25, in either direction. The corer endodontic file 17 is therefore a straight, partially tubular member with a C-shaped cross section orthogonal to its length, having spaced and facing parallel edges along at least a part of a length of cutting section 19 and joined by the sharp distal end 23. The debriding section member includes sharp saw tooth denticulated projections 21 extending along at least a portion of the parallel edges of the straight partially tubular member 19, with the C-shaped cross section. The extended C-shaped endodontic instrument 17 of FIGS. 5A and 5B, can either have a handle for manual rotation and cutting by the endodontist, or can be attached to a power tool in a motor driven version, such as power tool 41 of FIG. 16.

Figure 6:
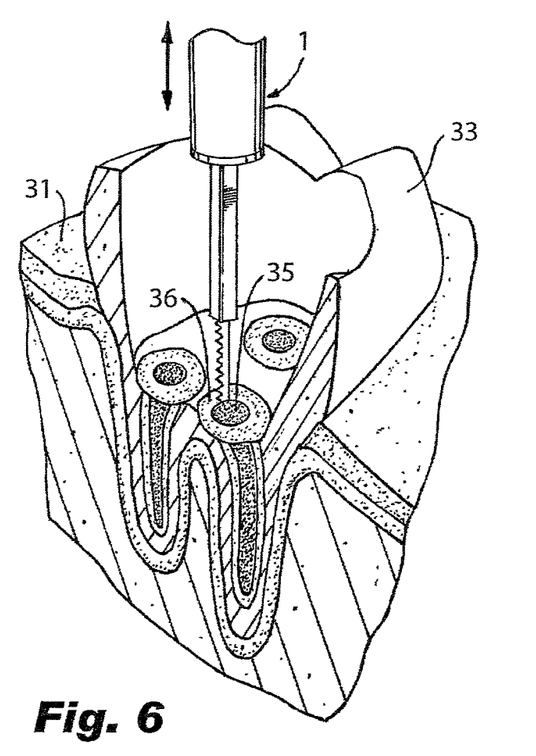
FIG. 6 is a perspective view of a tooth being debrided using a P-file to remove the gutta-percha (GP) surrounding a central carrier core in a root canal.
Figure 7:
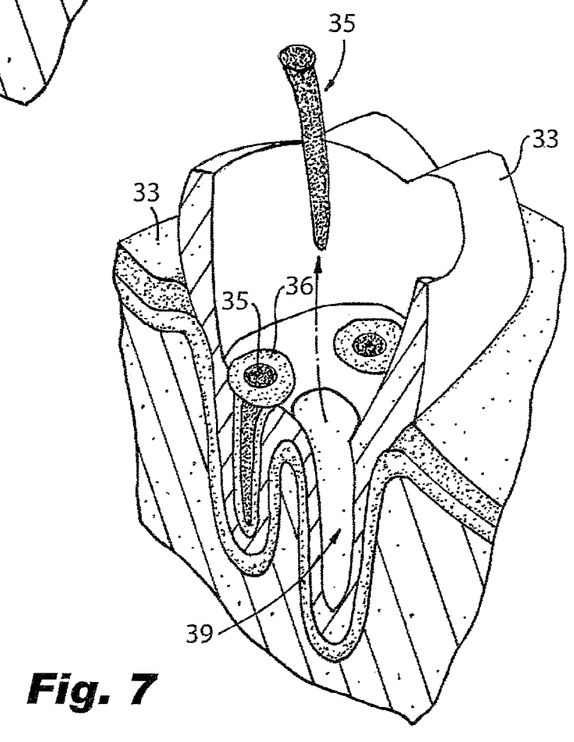
FIG. 7 is a perspective view of the result of the procedure of FIG. 6 with the gutta percha (GP) broken down and the central carrier core shown removed from the root canal.

Furthermore, FIGS. 6 and 7 illustrate some of the method involved in debridement as part of the retreatment process. In FIGS. 6 and 7, a partial tooth 33 with a side sliced to reveal three root canals below the gum 31 line, is shown. FIG. 6 shows a P-file 1 reciprocating while engaged with the obturating gutta percha (GP) annular seal 36 around the edge of plastic carrier core 35. The objective is to free root canal 39 of the obturating gutta percha 36 and plastic carrier core 35 as shown in FIG. 7. Therefore, the main goal of the endodontist in re-treating this kind of obturation material in the carrier core 35 (carrier-based obturation materials) is to maintain the carrier 35 as intact as possible, for easy retrieval, by indirectly digging into and removing the gutta percha material 36 surrounding the carrier 35 with the endodontic files 1, 11 or 17 of the present invention, without causing torsional fatigue and possible damage with a wide rotating instrument, but without the complexities of re-treatment with rotary files. By using the thin saw-blade teeth and thin cross-section of the cutting part, the endodontic files 1, 11 or 17 can fit and dig into the confines of the gutta percha 36 located between the carrier 35 and the dentin wall of tooth 33, while ripping through the surrounding gutta-percha 36 without potentially damaging the carrier 35, which is something the prior art rotary files cannot do without difficulty, owing to their wider, rounded cross-section and break susceptible rotary fluting.

FIGS. 8A, 8B, 9, 10, 11, 12 and 13 show alternate embodiments for different geometric shapes for the saw teeth denticulated projections.

Figure 8A:
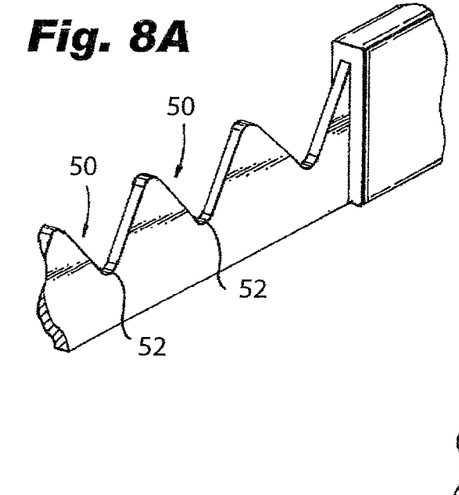
FIG. 8A shows a design for file teeth with a curved valley extending in the nadir between one tooth to an adjacent tooth.
Figure 8B:
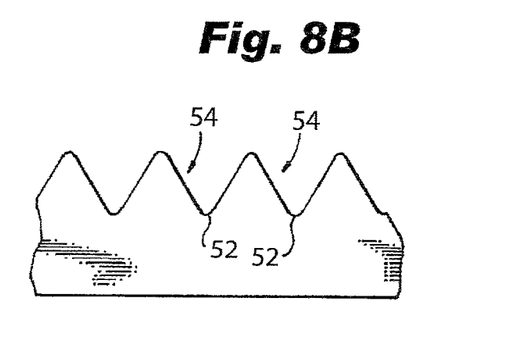
FIG. 8B is a close-up detail side elevation of file teeth with a curved valleys shown in FIG. 8A.

For example, FIG. 8A shows an enlarged design for an endodontic file having triangular teeth 50 with a concave curved valley 52 located at the nadir between adjacent teeth 50. The actual file teeth of FIG. 8A are shown in FIG. 8B as teeth 54, also with concave curved valleys 52 located at the nadirs between adjacent teeth 54.

Figure 9:
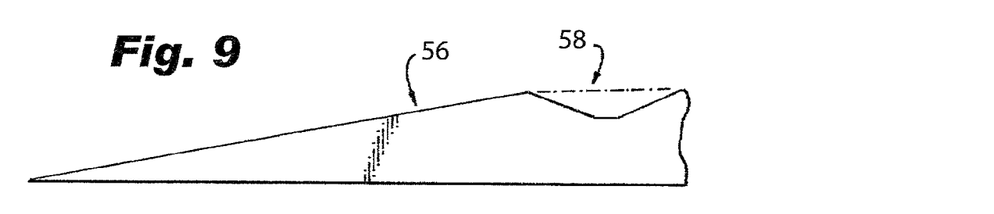
FIG. 9 is a side elevation of the distal end of an endodontic file having all teeth at the same level.

In the embodiment of FIG. 9, the distal end 56 of an endodontic file (enlarged) with evenly high teeth 58 are shown, which are not equal sided isosceles triangles.

Figure 10:
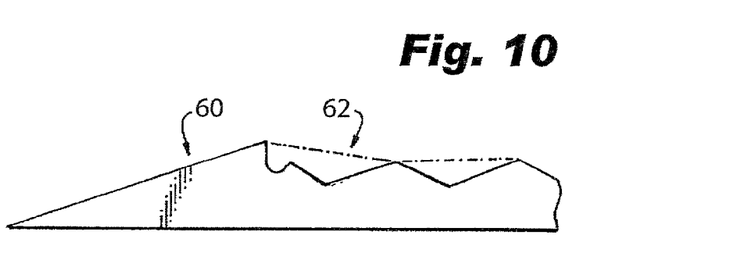
FIG. 10 is a side elevation of the distal end of an endodontic file having teeth at different levels.

In the embodiment of FIG. 10, the enlarged distal end 60 of an endodontic file having teeth of variable levels 62 is shown.

Figure 11:
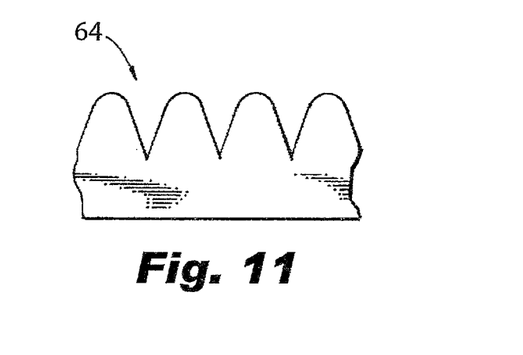
FIG. 11 is a side elevation of an endodontic file having hyperbolic, non-linear shaped cutting saw teeth.

FIG. 11 shows an endodontic file tooth profile in which saw teeth denticulated projections 64 are hyperbolic in shape. In this embodiment, the endodontic file can optionally have parabolic-shaped saw teeth 64 adjacent to one another, where instead of linear sides extending upward towards an apex point, as in FIGS. 1-5 and 8-10, the sides of saw teeth 64 would be extending upward and converging in curved lines towards a tangent to a curve, as in a parabola.

Figure 12:
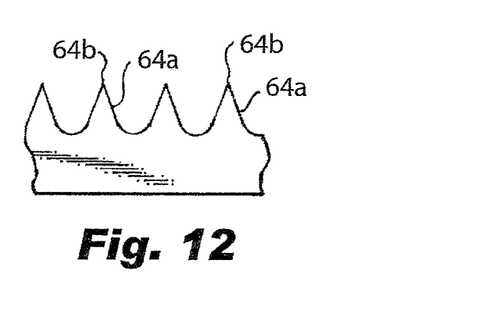
FIG. 12 is a side elevation of an endodontic file having non-linear shaped cutting saw teeth, based upon inverse parabolas, but with a pointed apex.

FIG. 12 shows an endodontic file tooth profile, similar to FIG. 11 in which saw teeth 64 are hyperbolic in shape. But in FIG. 12, the endodontic file can optionally have curved, arcuate-shaped saw teeth denticulated projections 64a adjacent to one another, where the curved arcuate sides extending upward towards an apex point 64b. Therefore, the sides of saw teeth 64a would be extending upward and converging towards a sharp apex point 64b. While the saw teeth in FIG. 11 form a parabola, in FIG. 12 the sides of each saw teeth are one half of a downwardly extending parabola, so that the curved sides meet at a pointed apex.

Therefore, in general, the saw teeth comprise two or more sides converging to a top apex point or region. When the converging sides are linear converging to an apex, as in FIGS. 1-4B and 8A-10, the shape of each saw tooth is that of a triangle, either equilateral or non-equilateral. If the converging sides are curved and arcuate, converging to a curved or pointed apex, as in FIGS. 11 and 12, then the shape of each saw tooth 64 and 64a of the blade is that of a parabola, as in FIG. 11, or of adjacent sides of an inverse parabola, as in FIG. 12.

Figure 13:
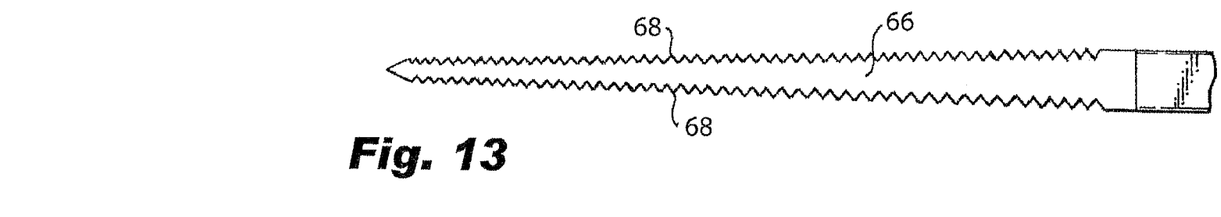
FIG. 13 is a side elevation showing an endodontic file with triangular teeth on both edges.

FIG. 13 shows an embodiment for a double-sided cutting endodontic file 66 having triangular teeth 68 on both edges.

Figures 14, 15:
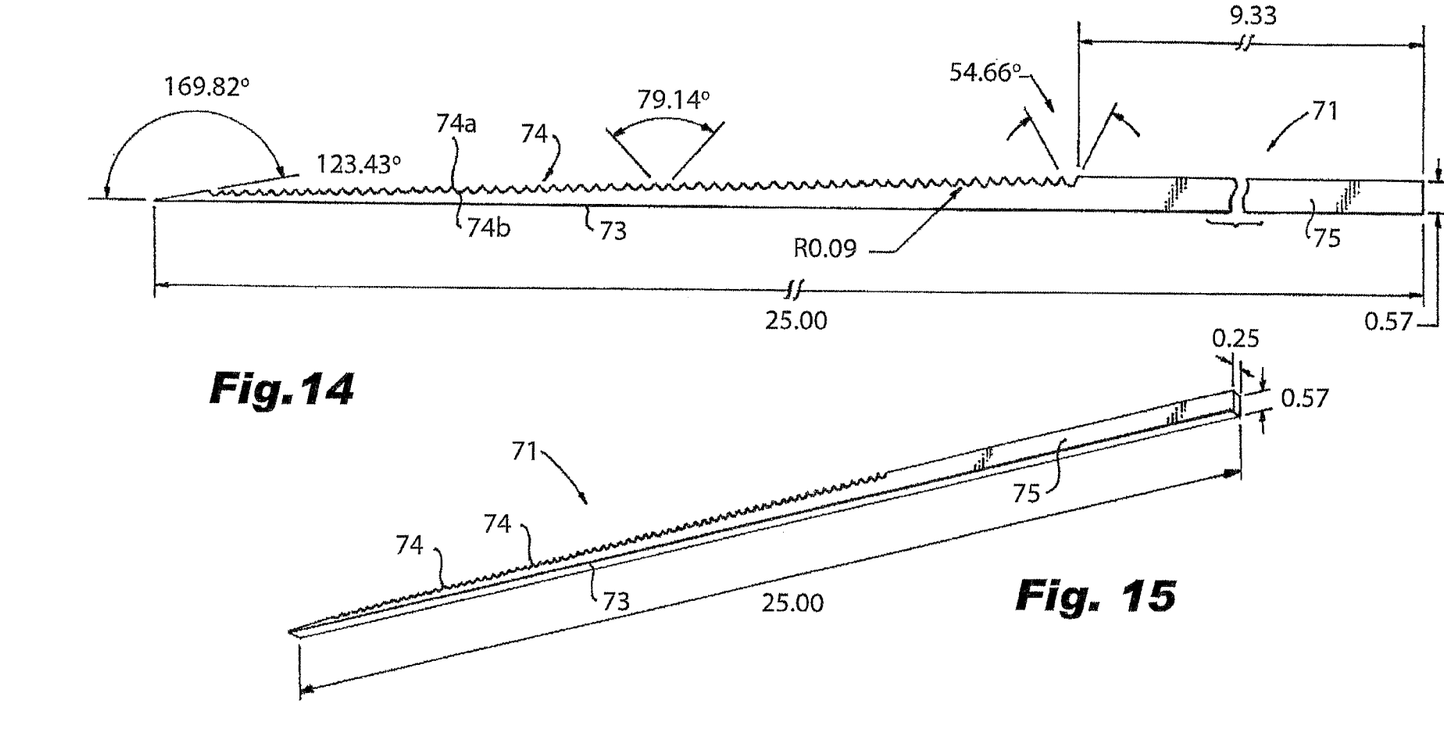
FIG. 14 is a side elevation view of another embodiment for an endodontic file, showing critical dimensions.
FIG. 15 is a perspective view from below of the endodontic file of FIG. 14, also showing critical dimensions.

FIGS. 14 and 15 illustrate two views of an endodontic file 71 (with handle not shown), cuboid shaped shank 75 on a metal portion, and cutting blade 73 having triangular cutting teeth 74 bearing isosceles triangular shapes in profile, where the teeth 74 have a forward facing side face that extends vertically, coterminous with the flat, also vertically extending shank support portion of the blade 73 below the teeth 74. Each tooth 74 of the cutting blade 73 of the endodontic file 71 has a sharp cutting point or region 74a. The shank 75 has a cuboid cross section. FIG. 14 also shows the endodontic file 71 having triangular teeth 74, but with a curved concave valley 74b between adjacent triangular teeth 74. Concave valley 74b is equivalent to the concave valley is identified as reference numeral "52" in drawing FIGS. 8A and 8B.

While dimensions may vary, in a preferred embodiment shown in FIGS. 14 and 15, the linear measurements are shown therein in millimeters. Therefore the length of endodontic file 71 is about 25 mm (0.984 inches) and the height at the proximal rear edge is about 0.57 mm. Additionally, the length of the cuboid shank 75 is about 9 to 9.33 mm, leaving the blade length of cutting blade 73 to be about 15.67 to 16 mm. The 54.66-degree angle shown in FIG. 14 refers to the angle between the last sloping edge of the saw teeth 74, as against the beginning front edge of the shank 75. The angle of 169.82 degrees, located at the distal cutting edge, refers to the angle from the horizontal bottom of cutting blade 73 to the initial slope of the distal portion 73a, before the first of the cutting teeth 74. The 79.14 degree angle represents the angle of the valley between a saw tooth 74 and its next adjacent saw tooth 74.

The number "R0.09" refer to length in millimeters of the radius of the small concave portion 74b in the depth of the respective valleys between each successive triangular silhouette shaped saw teeth 74.

The endodontic re-treatment instrument 71, is shown in an alternate embodiment, with sharp saw tooth denticulated projections 74, which are triangular in shape, having concave curved valleys 74b therebetween. The re-treatment instrument 71, can have a width extending in a range of between 0.10 mm and 0.50 mm, a length extending in a range of between about 20 mm and 30 mm and a vertical height extending in a range of between 0.40 mm and 0.75 mm, excluding a handle or motor driven adaptor at a proximal end thereof.

While dimensions may vary, because the example shown in FIGS. 14 and 15 has a width of only between 0.10 mm and 0.50 mm, preferably about 0.25 mm, along its length, it can easily dig into the three areas of gutta percha thicknesses described previously in Alhashimi et al, where the thicknesses of 0.376, 0.357 and 0.591 provide ample room for insertion of the endodontic file of FIGS. 14 and 15 with its thin thickness preferably of only 0.25 mm, or within the range of between 0.10 mm and 0.50 mm. While it would be too thick to be inserted at the gutta percha thickness of only 0.164, removal of three quarters of the gutta percha at the thicker thickness of 0.376 mm, 0.357 mm and 0.591 mm will enable the thinnest part to crumble by removal of its adjacent thicker portions exceeding the preferable 0.25 mm thickness of the endodontic file shown in FIGS. 14 and 15.

Generally, the deepest any endodontic re-treatment file tool can reach inside the root canal being re-treated is the best. For endodontic instrument with saw tooth denticulated cutting projections, of the present invention, reaching just halfway will be enough (average of 8-10 mm) to dig into and breakup the gutta percha to be removed from a tooth root canal of approximately 16-20 mm in length. However, in certain circumstances where the canal is straight, as opposed to curved at the apical end, yet, it can get into the full length of the canal owing to its design and thickness.

While the aforementioned new endodontic files introduced by this invention have been shown with handles for manual use, they can be powered. FIG. 16 shows a powered handpiece 41 comprising handpiece handle 43, power unit 45, and one of the three files of this invention (minus handles) chucked in power unit 45. The power unit can have the capability to follow the motions indicated by arrows 47, straight up and down, rotary in either direction, or alternate circular motion.

A preferred embodiment for a motor driven handpiece uses the prior art motor driven apparatuses of W & H DentalWerks of Germany for cutting jaw bones may be adapted for orthodontic rework. Their S-8 series supports sagittal, oscillating, or reciprocating movement.

For example, while the three new endodontic files introduced by this invention have been shown with handles for manual use, they can be powered. FIG. 16 shows a powered handpiece 41 comprising handpiece handle 43, power unit 45, and one of the various files of this invention (minus handles) chucked in power unit 45. The power unit can have the capability to follow the motions indicated by arrows 47, axially straight up and down, rotary in either direction, alternate circular motion, or combinations thereof.

Although the aforementioned U.S. Pat. No. 4,353,698 of McSpadden cited above is for use in obturating stripped root canals and not debridement, similar powered rotary tools with similar working ends are used in debridement today. With the use of plastic carriers surrounded by gutta percha (GP) or similar obturating material in a root canal undergoing retreatment, debridement including removal of the plastic carrier more often results in unwinding and separation of retreatment files (ProTaper). Two retreatment files of this invention may be better suited as powered working ends. One version is the generally thin P-file 1 of FIGS. 1 and 2, 3A and 3B, the P-file 11 of FIGS. 4A, 4B, the double sided file of FIG. 13, or the file 71 of FIGS. 14 and 15. Another version is the "corer file" of FIGS. 5A and 5B when sized with a cross section inner radius slightly larger than the outside diameter of the plastic carrier. These files would be moved in a compound fashion, reciprocating for active cutting away gutta percha, while rotating slowly (or in small discrete steps) around the carrier core for removal without damage by pulling from above with an instrument, such as a tweezer or other grasping hand tool. The instrument's path followed would be similar to that illustrated in FIG. 6, for removal of the outer gutta percha sheath 36 and central carrier core 35 The carrier core 35 is removed from root 39 intact, without damage to carrier core 34, as shown in FIG. 7.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A method of clearing a root canal in preparation for retreatment comprising the steps of:

inserting into said root canal a debriding section of an endodontic re-treatment instrument, said instrument comprising a handle adapted for manual manipulation without use of power, said debriding section, and a shank connecting said handle to said debriding section, said debriding section comprising a flat side not having any cutting edges and an upper edge having sharp saw tooth denticulated projections along a side opposite to said flat side, with each sharp saw tooth denticulated projection extending upward; and moving said instrument manually within said root canal for engaging a gutta percha sleeve surrounding a central carrier core therein, cutting away the gutta percha sleeve without damaging the carrier core, then said carrier core is released from said root canal, permitting removal of the carrier core therefrom the root canal.

2. The method of claim 1 in which said handle is manually manipulated causing said debriding section to move in upward, downward and/or sagittally and/or transversely within said root canal.

3. The method of claim 2 in which each said sharp saw tooth denticulated projection comprises two or more sides extending up from a lower blade-supporting portion and converging to a top apex.

4. The method of claim 3 wherein said two or more sides of said sharp saw tooth denticulated projections are linear, converging to said apex.

5. The method of claim 4 wherein said linear converging sides of said sharp saw tooth denticulated projections converge to an apex cutting point.

6. The method of claim 5 wherein said linear converging sides of said sharp saw tooth denticulated projections converging to an apex cutting point are a single row of three-dimensional pyramidal teeth each tapering to a point at a top thereof.

7. The method of claim 6 wherein each of said three dimensional pyramidal teeth comprise four triangular side faces coming to a point whereby said upper edge comprises a plurality of spaced pointed tops of said pyramidal teeth.

8. The method of claim 1 in which said saw tooth denticulated projections comprise isosceles triangular shaped teeth in profile, and where each said tooth has a forward facing side edge that extends at a vertical angle from said flat side.

9. The method of claim 1 in which said debriding section tapers to a narrowed distal end.

10. The method of claim 1 wherein said shank and debriding section are orthogonal to its length.

11. The method of claim 10 in which a distal end of said debriding section is ground to a sharp cutting edge.

12. The method of claim 1 wherein said shank is cuboid in shape.

13. The method of claim 1 having evenly high sharp saw tooth denticulated projections.

14. The method of claim 1 having said sharp tooth denticulated projections of variable levels.

15. The method of claim 1 in which said sharp tooth denticulated projections have pointed tops.

16. The method of claim 1 in which said instrument is made of stainless steel.

17. The method of claim 1 in which said instrument is made of nickel titanium.

18. The method of claim 1 wherein said sharp saw tooth denticulated projections are triangular, have concave valleys therebetween, said instrument having a width of between 0.10 mm and 0.50 mm, a length of between about 20 mm and 30 mm and a vertical height of between 0.40 mm and 0.75 mm, excluding a handle or motor driven adaptor at a proximal end thereof.

19. The method of claim 1 wherein said sharp saw tooth denticulated projections are triangular, have a concave valley therebetween, said instrument having a width of about 0.25 mm, a length of about 25 mm and a vertical height of about 0.57 mm.

20. A method of clearing a root canal in preparation for retreatment comprising the steps of:

inserting into said root canal a debriding section of an endodontic re-treatment instrument, said instrument comprising a handle adapted for manual manipulation without use of power, said debriding section, and a shank connecting said handle to said debriding section, said debriding section comprising a straight, partially tubular member with a C-shaped cross section orthogonal to its length, having spaced and facing parallel edges along a length thereof and joined by a sharp distal end, and said debriding section having sharp saw tooth denticulated projections extending along at least a portion of said spaced and parallel edges; and manipulating only manually said instrument within said root canal for engaging a gutta percha sleeve surrounding a central carrier core therein, cutting away the gutta percha sleeve without damaging the gutta percha carrier core, then said carrier core is released from said root canal, permitting its removal therefrom.

* * * * *